US009284992B2

(12) United States Patent  (10) Patent No.: US 9,284,992 B2
Sudau et al.  (45) Date of Patent: Mar. 15, 2016

(54) WET CLUTCH ARRANGEMENT

(71) Applicants: Joerg Sudau, Niederwerrn (DE); Arthur Schroeder, Dittelbrunn (DE)

(72) Inventors: Joerg Sudau, Niederwerrn (DE); Arthur Schroeder, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 160 days.

(21) Appl. No.: 14/181,120

(22) Filed: Feb. 14, 2014

(65) Prior Publication Data

US 2014/0202818 A1   Jul. 24, 2014

Related U.S. Application Data

(62) Division of application No. 13/502,075, filed as application No. PCT/EP2010/064784 on Oct. 5, 2010, now Pat. No. 8,893,867.

(30) Foreign Application Priority Data

Oct. 13, 2009  (DE) .......................... 10 2009 045 610

(51) Int. Cl.
  *F16D 33/00*  (2006.01)
  *F16D 25/0635*  (2006.01)
  *F16D 33/18*  (2006.01)
  *F16D 47/06*  (2006.01)
  *F16F 15/123*  (2006.01)

(52) U.S. Cl.
  CPC ............ *F16D 25/0635* (2013.01); *F16D 33/18* (2013.01); *F16D 47/06* (2013.01); *F16F 15/12353* (2013.01)

(58) Field of Classification Search
  CPC . F16D 25/0635; F16D 33/18; F16F 15/12353
  USPC ............. 192/3.31, 3.33, 3.3, 70.17, 212, 213, 192/213.1, 207, 200, 3.21, 3.28, 3.29, 192/70.16, 70.11
  See application file for complete search history.

(56) References Cited

U.S. PATENT DOCUMENTS

| 4,431,094 A | 2/1984 | Parthuisot et al. |
| 6,112,869 A * | 9/2000 | Krause ............... F16D 25/0635 192/213.1 |
| 6,244,401 B1 | 6/2001 | Maienschein et al. |
| 6,508,346 B1 * | 1/2003 | Simpson ................ F16H 45/02 192/213.1 |

(Continued)

FOREIGN PATENT DOCUMENTS

| DE | 199 20 542 | 11/1999 |
| EP | 0 036 216 | 9/1981 |

(Continued)

*Primary Examiner* — David J Hlavka
(74) *Attorney, Agent, or Firm* — Cozen O'Connor

(57) ABSTRACT

A wet clutch arrangement, particularly starting clutch for a vehicle, including a housing arrangement which is filled or fillable with fluid, a friction coupling region having a first friction surface formation rotating with the housing arrangement around an axis of rotation and a second friction surface formation that rotates with a driven element around the axis of rotation and which can be brought into frictional engagement with the first friction surface formation, a fluid coupling region with an impeller rotating with the housing arrangement around the axis of rotation and with a turbine that rotates with the driven element around the axis of rotation and which, along with the impeller, defines a toroidal fluid circulation space. The fluid coupling region is arranged radially outside the friction coupling region.

10 Claims, 11 Drawing Sheets

(56) References Cited

U.S. PATENT DOCUMENTS

| | | | | |
|---|---|---|---|---|
| 7,650,973 B2 * | 1/2010 | Tsukamoto | ......... | F16D 25/0638 192/213.2 |
| 7,975,817 B2 * | 7/2011 | Mueller | .................. | F16H 45/02 192/213.1 |
| 2004/0226794 A1 * | 11/2004 | Sasse | ................ | F16F 15/12366 192/3.29 |
| 2005/0133328 A1 * | 6/2005 | Masuya | .................. | B60K 6/387 192/3.3 |
| 2005/0155831 A1 * | 7/2005 | Masuya | .................. | F16H 45/02 192/3.3 |
| 2007/0251788 A1 * | 11/2007 | Heck | ........................ | F16H 45/02 192/3.3 |
| 2008/0121485 A1 * | 5/2008 | Degler | .................... | F16H 45/02 192/3.29 |
| 2008/0173510 A1 * | 7/2008 | Saka | ........................ | F16H 45/02 192/3.28 |
| 2009/0057086 A1 | 3/2009 | Abe | | |
| 2009/0125202 A1 * | 5/2009 | Swank | ............... | F16F 15/12353 701/68 |
| 2009/0242348 A1 * | 10/2009 | Ishikawa | ............. | F16D 25/0638 192/55.61 |
| 2011/0240429 A1 * | 10/2011 | Heuler | .................... | F16F 15/145 192/3.28 |

FOREIGN PATENT DOCUMENTS

| | | |
|---|---|---|
| EP | 0 508 528 | 10/1992 |
| EP | 1 762 737 | 3/2007 |

* cited by examiner

WET CLUTCH ARRANGEMENT

CROSS REFERENCE TO RELATED APPLICATIONS

This application is a Divisional of U.S. patent application Ser. No. 13/502,075, filed Apr. 13, 2012, which is a U.S. national stage of application No. PCT/EP2010/064784, filed on Oct. 5, 2010. Priority is claimed on German Application No. 10 2009 045 610.4 filed Oct. 13, 2009, the content of which is incorporated herein by reference.

BACKGROUND OF THE INVENTION

Field of the Invention

The present invention is directed to a wet clutch arrangement, particularly a starting clutch for a vehicle, comprising a housing arrangement filled or fillable with fluid, a friction coupling region having a first friction surface formation rotating with the housing arrangement around an axis of rotation, and a second friction surface formation that rotates with a driven element around the axis of rotation and that can be brought into frictional engagement with the first friction surface formation, a fluid coupling region with an impeller rotating with the housing arrangement around the axis of rotation and with a turbine that rotates with the driven element around the axis of rotation and which, along with the impeller, defines a toroidal fluid circulation space.

In wet clutch arrangements, a fundamental problem is that after an extended period of disuse the fluid contained in the housing arrangement during driving operation has partially flowed out of the housing arrangement into a fluid sump in a gearbox. This means that the housing arrangement is only partially filled with fluid, generally oil, for subsequent starting, and the fluid still contained in the housing arrangement collects in the radially outer region as a result of centrifugal force during rotation of the housing arrangement. However, in view of the fact that fluid is generally required to engage the friction coupling region, there may occur a state in which no torque can be transmitted over a certain period of time after starting for lack of the possibility of filling the piston chamber and, therefore, engaging the friction coupling region.

SUMMARY OF THE INVENTION

It is an object of one embodiment of the present invention to provide a wet clutch arrangement, particularly starting clutch for a vehicle, by which an improved operating characteristic is achieved.

According to one embodiment of the present invention, a wet clutch arrangement, particularly starting clutch for a vehicle, comprises a housing arrangement filled or fillable with fluid, a friction coupling region having a first friction surface formation rotating with the housing arrangement around an axis of rotation and a second friction surface formation that rotates with a driven element around the axis of rotation and which can be brought into frictional engagement with the first friction surface formation, a fluid coupling region with an impeller rotating with the housing arrangement around the axis of rotation and with a turbine which rotates with the driven element around the axis of rotation and which, along with the impeller, defines a toroidal fluid circulation space.

In this regard, it is further provided that the fluid coupling region is arranged radially outside the friction coupling region.

Owing to the fact that the fluid coupling region and friction coupling region are radially staggered such that the fluid coupling region lies radially outside the friction coupling region, it is ensured when a vehicle is operated after an extended period of disuse that torque can be transmitted by the fluid collecting radially outwardly during rotation in the fluid coupling region through fluid circulation and the torque transmitting interaction generated thereby between the impeller and the turbine. This torque makes it possible to start also immediately after initiating operation and when the housing arrangement is partially empty until, by corresponding conveying action of a fluid pump which is arranged in a gearbox and is operated by the rotation of the housing arrangement, fluid is gradually conveyed back into the housing arrangement and, through buildup of a corresponding fluid pressure, the friction coupling region can also be adjusted in the engagement direction.

At the same time, the radial staggering of the fluid coupling region and friction coupling region positively assures a fluid circulation flowing around the friction surface formations of the friction coupling region from the radially inner side to the radially outer side so that an efficient cooling of the surface regions entering into frictional interaction with one another can also be achieved over an extended slippage state.

It is advantageous, particularly for providing the above-mentioned conveying effect for cooling the friction surface formations, when the friction coupling region and the fluid coupling region at least partially overlap axially.

A variant which is especially advantageous in terms of construction because of a small number of parts can be provided in that the turbine is constructed integral with a friction element of the second friction surface formation.

To enable a damping of rotational irregularities in the area of the clutch arrangement in the torque transmitting state, it can be provided that the turbine and/or the second friction element arrangement is coupled with the driven element by a torsional vibration damper arrangement.

In so doing, the torsional vibration damper arrangement can be constructed in such a way that it has a first torsional vibration damper region and, in series therewith, a second torsional vibration damper region. The second friction surface arrangement is connected to an input region of the first torsional vibration damper region, and an output region of the second torsional vibration damper region is optionally connected to the driven element by a third torsional vibration damper region.

In order to be able to make use of both torsional vibration damper regions in the torque flow between the turbine and the driven element, it can be provided that the turbine is connected to the input region of the first torsional vibration damper region.

In an alternative variant which is very advantageous with respect to the decoupling of vibrations, it is suggested that the turbine be connected to an output region of the first torsional vibration damper region and/or to an input region of the second torsional vibration damper region. Accordingly, in this case the turbine is mass-coupled to an intermediate region between the two torsional vibration damper regions so that in this case operation is carried out basically in the manner of a three-mass damper with a drive-side vibration mass, a driven-side vibration mass, and an intermediate mass which is substantially also provided with the turbine.

A further saving on structural component parts can be achieved in that the impeller has an impeller shell which is provided by the housing arrangement.

In a variant that is particularly advantageous chiefly with respect to the generation of a fluid circulation in the housing arrangement for cooling the friction surface formation, it is suggested, optionally also in combination with the aspects mentioned above, in a construction of a clutch arrangement defined in the introductory part, that a region of the toroidal fluid circulation space defined by the impeller has a greater radial extension than a region of the toroidal fluid circulation space defined by the turbine. Because the impeller gives a greater radial extension for the toroidal fluid circulation space than the turbine, a fluid circulation that penetrates the housing arrangement and also includes the friction surface formations is generated by the impeller of larger dimensions in addition to the fluid circulation generated between the impeller and turbine in the slippage state.

The impeller and the turbine define the toroidal fluid circulation space at its radially inner region substantially on the same radial level and that the turbine defines the toroidal fluid circulation space at its radially outer region farther towards the radially inner side than the impeller.

According to one embodiment which can also be combined with the aspects discussed above, the present invention is directed to a wet clutch arrangement comprising a housing arrangement filled or fillable with fluid, a friction coupling region having a first friction surface formation rotating with the housing arrangement around an axis of rotation and a second friction surface formation that rotates with a driven element around the axis of rotation and which can be brought into frictional engagement with the first friction surface formation, a pressing element by which the first friction surface formation and the second friction surface formation can be brought into frictional engagement, wherein an interior space of the housing arrangement is divided by the pressing element into a first space region containing the turbine and a second space region which is located substantially radially inside the friction surface arrangements, a dividing element which, together with the pressing element, defines a third space region which is substantially separated from the first space region and second space region, wherein fluid can be supplied to the third space region for actuating the pressing element.

By providing a third space region which is to be supplied with pressurized fluid for actuating the pressing element, it is possible to maintain the first space region on one hand and the second space region on the other hand in a substantially pressureless state, which in particular allows the fluid arriving in the second space region to flow around the friction surface formations to an increased extent. In this regard, it can be provided that the third space region is located at the axial side of the pressing element facing the first space region.

In order to allow the friction coupling region to be adjusted in the disengagement direction without requiring an increased fluid pressure in one of the space regions, it is suggested that, at the axial side of the pressing element remote of the third space region, a pre-loading arrangement loads the pressing element in opposition to the fluid pressure that can be generated in the third space region.

The pressing element can be connected to the housing arrangement for corotation therewith and can have a first aperture arrangement connecting the first space region to the second space region for producing an efficient fluid flow connection between the first space region and the second space region radially inside the friction surface formations. This aperture arrangement connects the space regions which are basically at the same pressure level and are separated from one another by the pressing element and accordingly makes it possible, particularly under the aforementioned conveying action of the impeller, that fluid which is conveyed radially outward by the impeller and therefore arrives in the first space region can flow again into the second space region through the first aperture arrangement and from the second space region radially outward into the region of the friction surface formations.

In order that the clutch arrangement can be constructed based on the two-line principle, i.e., so that only a supply line for supplying fluid and a discharge line for discharging fluid need be provided, it is further suggested that the pressing element has radially inwardly of the first aperture arrangement a second aperture arrangement connecting the third space region to the second space region. The fluid which is possibly also directed under pressure into the third space region for actuating the pressing element can arrive in the second space region through this second aperture arrangement and can exit the second space region in direction of the first space region so as to flow around the friction surface formations and be discharged from the first space region and guided back into the flow circuit.

To prevent excessive leakage of fluid with a corresponding loss of pressure in the third space region, a total cross-sectional flow area of the first aperture arrangement is larger than a total cross-sectional flow area of the second aperture arrangement.

Particularly when there is no operative fluid coupling region particularly in the start phase in the clutch arrangement in addition to the friction coupling region, it is advantageous for generating the fluid circulation flowing around the friction surface formations that a pump formation is provided at the housing arrangement and/or at the pressing element for circumferentially entraining fluid contained in the first space region or in the second space region.

In this respect, the pump formation can have at least one pump delivery surface in the second space region, preferably radially inside the friction surface formation. By this at least one pump delivery formation, a flow directed directly to the friction surface formations is generated when the fluid contained in the second space region is circumferentially entrained and correspondingly accelerated radially outward.

It can be provided alternatively or additionally that the pump formation has at least one pump delivery surface in the first space region, preferably radially outside the friction surface formations.

In an arrangement which is very simple to carry out in terms of construction but which is also compact at the same time, the dividing element is formed in a disk-like manner axially opposite a housing shell of the housing arrangement. In so doing, the pressing element is held substantially between the dividing element and the housing shell of the housing arrangement. The dividing element can be connected, for example, welded, in its radially inner area to the housing shell.

In a clutch arrangement constructed according to one embodiment of the invention with a friction coupling region and a fluid coupling region, particularly in that construction in which the above-mentioned radial staggering of the friction coupling region and fluid coupling region is provided, a housing shell which is to be positioned facing the gearbox is generally not provided with the impeller vanes, which are provided in principle in a hydrodynamic torque converter and which stiffen the housing shell and extend comparatively far radially inward. Particularly at a higher rotational speed, this can present a problem in that the housing, which is not stiffened, can balloon out owing to the fluid pressure which increases as a result of centrifugal force.

In order to counter this problem, it can be provided in a clutch arrangement of the type defined in the introductory part which is optionally outfitted with the features indicated above that the housing arrangement comprises a first housing shell which is to be positioned facing the engine and a second housing shell which is to be positioned facing the gearbox and which is connected radially outwardly to the first housing shell in a fluid-tight manner, wherein the second housing shell is curved radially inward in a first curvature region adjoining the area of the connection to the first housing shell and extends radially inward in the direction away from the first housing shell in a first transition region adjoining the first curvature region and is curved radially inward in a second curvature region adjoining the first transition region and extends radially inward in the direction of the first housing shell in a second transition region adjoining the second curvature region. By providing the two curvature regions, a geometry is provided which is very stiff but which nevertheless provides the required installation space for the components to be received in the housing arrangement.

In this regard, it is preferably provided that a radius of curvature in the first curvature region is greater at least in some areas than a radius of curvature in the second curvature region.

Further, particularly in case of a correspondingly large radial construction, it can be provided that the second housing shell extends substantially in a straight line in the first transition region and/or in the second transition region.

Since other components, e.g., a torsional vibration damper arrangement, aside from the components provided for generating the torque transmission interaction are generally provided in a clutch arrangement having the construction described in the introductory part, it is suggested in a further very advantageous construction to provide the impeller at an engine-side housing shell of the housing arrangement. By providing the impeller at an engine-side housing shell, possibly also so as to be integrated therein, it is ensured that substantially all of the components serving to interact in a torque transmitting manner, i.e., the impeller and turbine of the fluid coupling region on the one hand and the friction surface formations on the other hand, are arranged in the region of this engine-side housing shell. The volume area which is essentially provided by the gearbox-side housing shell can then be used, for example, to accommodate a torsional vibration damper arrangement therein. This ensures a very clear structuring and distribution of component parts to the volume areas provided by the two housing shells, which particularly also facilitates the production of a clutch arrangement of this kind by generating preassembly component groups.

BRIEF DESCRIPTION OF THE DRAWINGS

The present invention will be described more fully in the following with reference to the accompanying drawings. The drawings show.

DETAILED DESCRIPTION OF THE PREFERRED EMBODIMENTS

Figure 1:
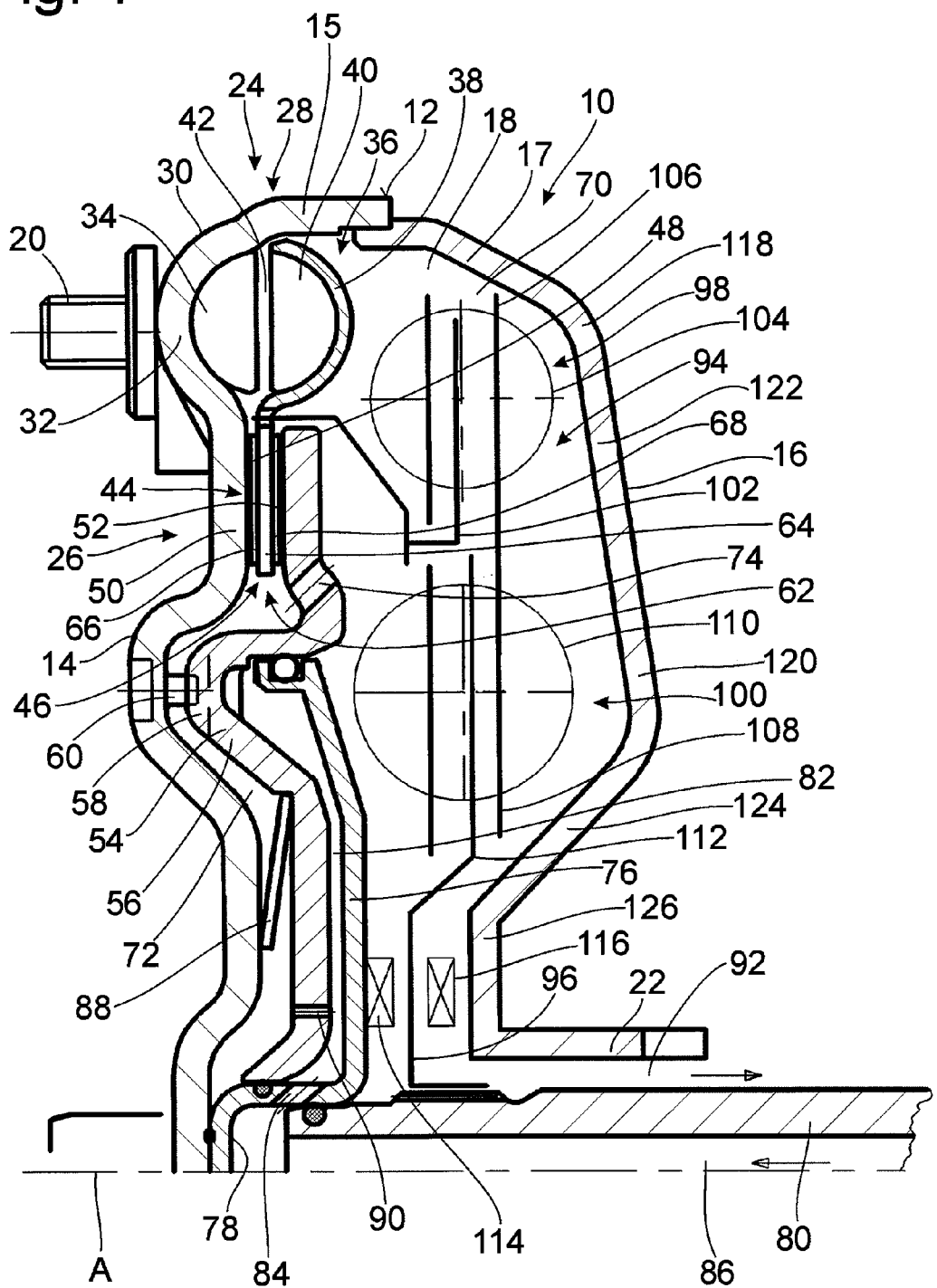
FIG. 1 is a view in partial longitudinal section through a wet clutch arrangement with fluid coupling region and friction coupling region.

In FIG. 1, a wet clutch arrangement for the power train of a vehicle is designated generally by 10. This clutch arrangement 10 which can be used as a starting element comprises a housing arrangement 12 having a housing shell 14 which is to be positioned facing the engine, i.e., engine-side housing shell 14, and a housing shell 16 which is to be positioned facing the gearbox, i.e., gearbox-side housing shell 16. The two housing shells 14, 16 are fixedly connected to one another, for example, by welding, in their radially outer areas 15, 17 extending toward one another and together define an interior space 18 of the housing arrangement 12. A clutch arrangement 20 is provided at the engine-side housing shell 14; the housing arrangement 14 can be connected via this clutch arrangement 20 by a flexplate assembly or the like, to a driveshaft, for example, a crankshaft of an internal combustion engine, for corotation around an axis of rotation A. In its radially inner area, the gearbox-side housing shell 16 has a pump hub for driving a fluid pump. The pump hub is either formed integral therewith or joined thereto as a separate structural component part and is to be positioned so as to engage in a gearbox housing.

The clutch arrangement 10 comprises a fluid coupling region 24 and, directly radially inside the latter, a friction coupling region 26. The fluid coupling region 24 and the friction coupling region 26 lie approximately on the same axial level, i.e., overlap one another axially. Further, it will be seen that the fluid coupling region 24 is provided in the radially outermost area of the housing arrangement 12, while the friction coupling region 26 is offset somewhat radially inwardly with respect to this position.

The fluid coupling region 24 comprises an impeller 28 with an impeller shell 32 formed by a radially outer area 30 curved in direction of the gearbox-side housing shell 16. A plurality of impeller vanes 34 disposed successively in circumferential direction are carried at the inner side of this impeller shell 32.

A turbine 36 is provided axially across from the impeller 28. This turbine 36 comprises a turbine shell 38 having a plurality of turbine blades 40 which are supported thereon and which are located axially opposite the impeller vanes 34. The impeller 28 and the turbine 36 together define a toroidal fluid circulation space 42 which has an approximately circular cross section geometry in the illustrated example. During relative rotation between the impeller 28 and the turbine 38, a torque is transmitted therebetween by fluid circulation.

The friction coupling region 26 comprises two friction surface formations 44, 46. The first friction surface formation 44 is rotatable with the housing arrangement 12 around the axis of rotation A and comprises a first friction surface 48 at a portion 50 of the engine-side housing shell 14 located radially inside the impeller shell 32 and extending radially outwardly substantially in a straight line and a second friction surface 52 at the radially outer region of a clutch piston 54 acting as pressing element. In an axially curved region 56 conforming to the shape of the engine-side housing shell 14, this clutch piston 54 is outfitted with a plurality of indentations 58 arranged successively in circumferential direction and which are produced by deformation. Shaped portions 60 formed at the engine-side housing shell 14 engage in the indentations 58 and accordingly produce a rotational coupling between the clutch piston 54 and the housing arrangement 12.

The second friction surface formation 46 comprises a friction element 62 having a friction lining carrier 64 and friction linings 66, 68 provided at both axial sides thereof. Friction lining 66 cooperates with friction surface 48, while friction lining 68 cooperates with friction surface 52.

It will be seen from FIG. 1 that the friction element 62 or the friction element carrier 64 thereof is formed integral with the turbine shell 38, for example, by deformation of an annular disk-shaped sheet metal blank. This results in a very compact construction which can easily be produced with a very small number of parts.

By the clutch piston 54 which acts as pressing element and which also provides a portion of the second friction surface formation 46 on the radially outer side, the interior space 18 of the housing arrangement 12 is divided into a first space region 70 also containing the turbine 36 and a second space region 72 substantially limited between the clutch piston 54 and the engine-side housing shell 14. A first aperture arrangement 74 having, for example, a plurality of apertures arranged successively in circumferential direction and penetrating the clutch piston 54 produces a fluid exchange connection between the first space region 70 and the second space region 72 in the region of the clutch piston 54 which radially inwardly adjoins the friction coupling region 26.

A dividing element 76, which is generally disk-shaped and is formed from sheet metal material, is fixed in the radially inner area thereof to the engine-side housing shell 14, for example, by welding. In its radially inner area, the dividing element 76 forms an axial shaped portion 78 in which an axial end of a transmission input shaft acting as driven shaft 80 is connected in a fluid-tight manner. The clutch piston 54 is axially movably guided on the dividing element, which is preferably formed in one piece, and produces a fluid-tight closure by respective sealing elements. In the area of the dividing element 76 located further radially outward, the dividing element 76, together with the clutch piston 54, defines a third space region 82. This third space region 82 is located at the axial side of the clutch piston 54 facing the first space region 70 and can be supplied with pressure fluid via one or more supply openings 84 formed in the axial shaped portion of the dividing element 76 and an opening 86 centrally formed in the driven shaft 80. This pressure fluid can lead to a pressure buildup in the third space region 82 with corresponding axial loading of the clutch piston 54. Accordingly, this clutch piston 54 is displaced in direction of the friction element 62 against the pre-loading effect of a pre-loading arrangement 88, for example, a disk spring, in order to engage the friction coupling region 26.

A second aperture arrangement 90 having, for example, a plurality of apertures arranged successively in circumferential direction and penetrating the clutch piston 54 in the radially inner area thereof connects the second space region 72 to the third space region 82 so that fluid leakage from the third space region 82 into the second space region 72 can also take place during pressure buildup. In spite of the provision of this second aperture arrangement 90, the third space region 82 is separated from the first space region 70 as well as from the second space region 72 by the dividing element 76 on the one side and the clutch piston 54 on the other side. As a result of providing the second aperture arrangement 90, fluid is also supplied to the second space region 72 from the radially inner side. This fluid also flows radially outwardly under centrifugal force into the area of the first aperture arrangement 74 and friction surface formations 44, 46. The latter can have, in the area of the friction linings 66, 68, grooves or channels leading from the radially inner side to the radially outer side so that even when the friction coupling region 26 is engaged or in the slippage state, fluid flowing radially inwardly against the friction coupling region 26 can flow through the friction linings 66, 68 radially outwardly into the area of the fluid coupling region 24 and, in so doing, can remove heat from the area of the friction coupling region 26. To this end, not only the fluid arriving in the second space region 72 through the second aperture arrangement 90, but also in particular fluid arriving in the second space region 72 through the first aperture arrangement 74 in the radially outer area of the clutch piston 54 can be used. To this end, the first aperture arrangement 74 preferably has an appreciably larger total cross-sectional flow area than the second aperture arrangement 90.

The delivery of fluid for generating this fluid circulation is also carried out when the friction coupling region 26 is engaged, i.e., is not slipping, particularly through the conveying action of the impeller vanes 34. The latter entrain in circumferential direction the fluid collecting radially outwardly of the friction coupling region 26 and generate a centrifugal force effect which conveys the fluid from the area which radially outwardly adjoins the friction coupling region 26 even further radially outwardly and accordingly generates a pressure difference between the radially outer area of the friction coupling region 26 and the radially inner area thereof. This pressure difference leads to a fluid circulation between the first space region 70 and the second space region 72, which fluid circulation flows around the friction surface formations 44, 46.

The fluid arriving in the first space region 70 via the third space region 82 and the second space region 72 while circulating around the two friction surface formations 44, 46 can be drawn out of the first space region 70 radially inwardly into an annular space region 92 formed between the pump hub 22 and the driven shaft 80. During this radially inward flow, the fluid flows around a torsional vibration damper arrangement 94 which is arranged in the first space region 70, particularly in the portion of the first space region 70 enclosed by the gearbox-side housing shell 16. This torsional vibration damper arrangement 94 couples the turbine 36 with a driven element 96 which is located on the radially inner side and which is formed in the manner of a hub. This driven element 96 is in turn coupled, for example, through splines or the like, to the driven shaft 80 so as to be fixed with respect to rotation relative to it.

The torsional vibration damper arrangement 94 is constructed with two torsional vibration damper regions 98, 100 which act in series and are disposed in a radially staggered manner. An input region 102 of the radially outer first torsional vibration damper region 98, which input region 102 comprises, e.g., a central disk element, is coupled to the turbine 36 axially, for example, by a toothed plug-in, and to the second friction surface formation 46 which is formed integral with the turbine 36. A damper spring arrangement 104 of the first torsional vibration damper region 98 transmits the torque further to an output region 106 of the first torsional vibration damper region 98, which output region 106 comprises, for example, two center disk elements. This first torsional vibration damper region 98 is connected in turn to an input region 108 of the second torsional vibration damper region 100, which input region 108 is provided farther radially inwardly, for example, by the same cover disk elements. A damper spring arrangement 110 of the second torsional vibration damper region 100 transmits the torque further to an output region 112 of the second torsional vibration damper region 100, which output region 112 comprises a central disk element. This output region 112 can be connected to the driven element 96 or formed integral therewith. In particular, the output region 112 and driven element 96, respectively, can be supported and, therefore, bearing-mounted on the one side by two axial bearings 114, 116 in axial direction with respect to the dividing element 76 which is fixedly connected to the engine-side housing shell 14 and on the other side by the gearbox-side housing shell 16.

The construction of a wet clutch arrangement 10 shown in FIG. 1 makes it possible, even when the housing arrangement 12 is partially empty, to transmit torque in the starting state and with fluid collecting radially outwardly through the fluid coupling region 24 even when no fluid has collected yet farther radially inward, particularly in the third space region 82, to act upon the clutch piston 54 for engaging the friction coupling region 26. Further, an efficient fluid circulation is generated also by the conveying action of the impeller 28 which removes heat from the area of the friction coupling region 26 arranged directly radially inside the fluid coupling region 24.

A very space-saving method of construction is provided in that both coupling regions 24, 26, together with the clutch piston 54 and also with the dividing element 76 which defines the third space region 82 with the clutch piston 54, are received substantially completely in the portion of the interior space 18 defined by the engine-side housing shell 14. As a result, the entire portion of the interior space 18 enclosed by the gearbox-side housing shell 16 can be used to receive the torsional vibration damper arrangement which can accordingly be realized in a correspondingly large construction. This makes it possible to use correspondingly large and bulky springs for the damper spring arrangements 104, 110 with correspondingly good decoupling quality.

It will further be seen that due to the fact that the impeller 28 is provided in the area of the engine-side housing shell 14 and is also integrated therein in the illustrated instance, the gearbox-side housing shell 16 carries no components, e.g., impeller vanes, contributing to the stiffening thereof. To prevent a ballooning of this gearbox-side housing shell 16 during rotational operation, this gearbox-side housing shell 16, like the engine-side housing shell 14, generally being provided as a deformed sheet metal part, the gearbox-side housing shell 16 is formed with two curvature regions 118, 120. The radially outer curvature region 118 conforms to the portion 17 of the gearbox-side housing shell 16, which portion 17 extends toward the engine-side housing shell 14 possibly also in a slightly curved and partially straight manner, respectively, and connected to the latter, and curves the gearbox-side housing shell 116 radially inwardly proceeding from the portion 17 extending in direction of the engine-side housing shell 14, so that a first transition region 122 extends from the first curvature region 118 radially inwardly, but away from the engine-side housing shell 14, substantially in a straight line and toward the second curvature region 102. In this second curvature region 120, the gearbox-side housing shell 16 is again curved radially inwardly, but this time in direction of the engine-side housing shell 14, so that a second transition region 124 again extends substantially in a straight line toward the engine-side housing shell 14 and radially inwardly. A substantially radially extending portion 126 adjoining the second transition region 124 produces the connection to the pump hub 22.

Owing to this geometry, in which the radius of curvature of the radially outer first curvature region 118 is preferably greater than the radius of curvature of the second curvature region which lies further radially inward, the special shaping ensures that also higher fluid pressures occurring in the interior space 18 particularly as a result of centrifugal force cannot lead to a ballooning of the gearbox-side housing shell 16.

Further, owing to the fact that in the construction described above, the highest hydraulic pressure which is also required for actuating the friction coupling region 26 is present in the third space region 22, but the latter is defined in its entirety by the clutch piston 54 and the dividing element 76, i.e., neither of the two housing shells 14, 16 receives this comparatively high pressure, the risk of ballooning of the housing arrangement 12 is further reduced. Further, this construction ensures that the clutch piston 54 is not subject to one-sided loading by fluid under centrifugal force in the rotating state, which allows an appreciably improved fluid pressure-dependent control of this clutch piston 54.

Figure 2:
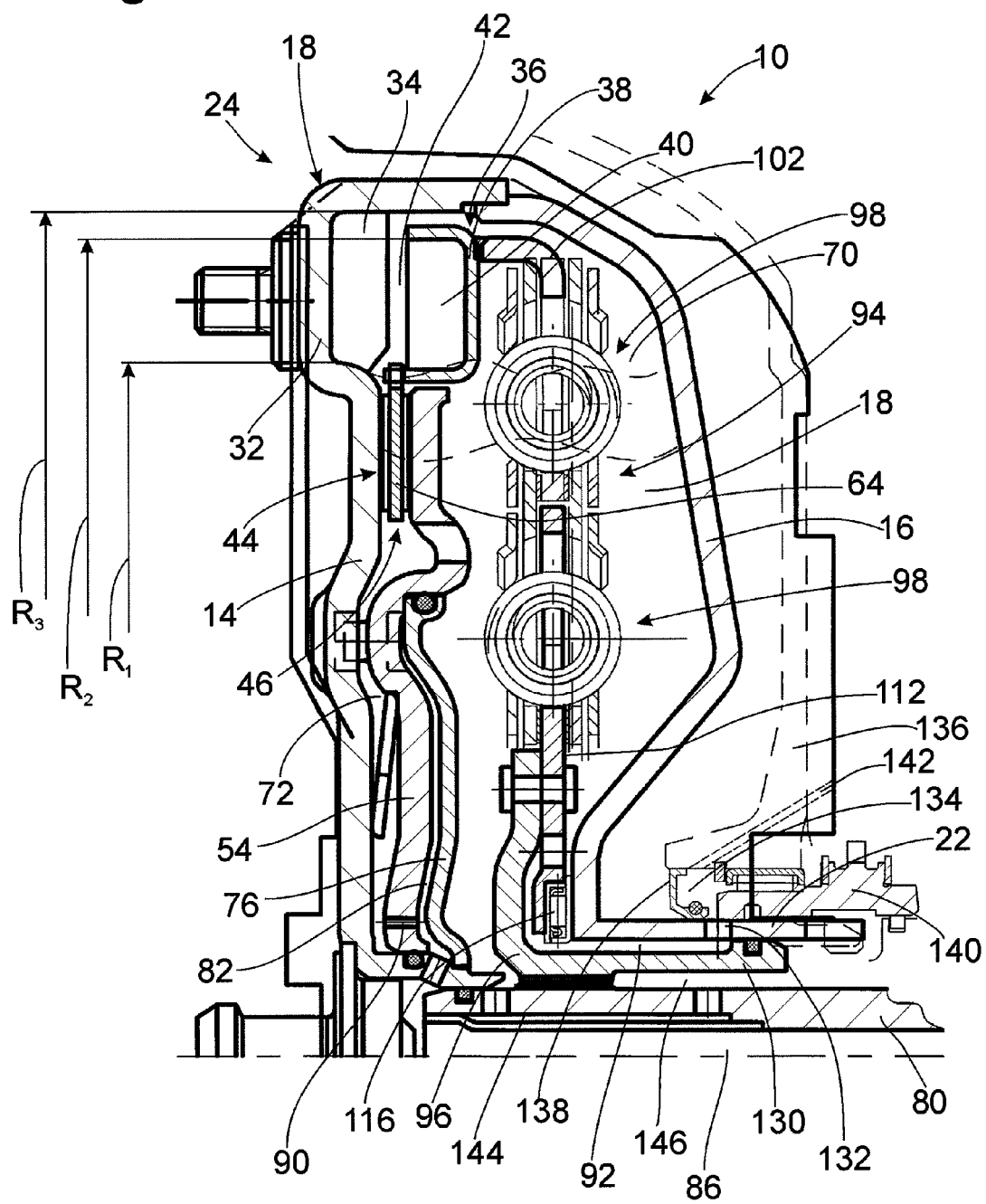
FIG. 2 is an alternative embodiment form in a view corresponding to FIG. 1.

A modified embodiment form of a wet clutch arrangement 10 is shown in FIG. 2. In terms of its basic construction, this wet clutch arrangement 10 corresponds to the construction described above so that reference may be had to the preceding statements and only the essential differences will be discussed in the following.

First, it will be seen that the toroidal fluid circulation space 42 in the fluid coupling region 24 is provided with an approximately square cross-sectional geometry, i.e., diverging from the circular geometry. This results in a corresponding shaping of the impeller shell 32 provided at the engine-side housing shell 14 and of the turbine shell 38 and blades 34, 40 supported thereon.

It will further be seen from FIG. 2 that the impeller 28 and the turbine 36 define the toroidal fluid circulation space 42 radially inwardly on approximately the same radial level $R_1$. Radially outwardly, however, the turbine 36 defines the toroidal fluid circulation space 42 on a radial level $R_2$ which lies further radially inward than a radial level $R_3$ on which the impeller 28 defines the toroidal fluid circulation space 42. As a result of this geometry, due to the longer extension of the impeller 28 radially outwardly, in addition to the fluid circulation built up in the toroidal fluid circulation space 42 between the impeller 28 and the turbine 36, a stronger conveying effect is generated in which fluid is delivered radially outwardly while flowing around the two friction surface formations 44, 46. The fluid then flows past the radial outer side of the turbine shell 38 into the portion of the first space region 70 containing the torsional vibration damper arrangement 94.

Further, it will be seen that in this embodiment form the turbine 36 is not formed integral with the second friction surface formation 46 or with a friction lining carrier 64 thereof. The friction lining carrier 64 and the turbine shell 38 are in positive rotational coupling engagement by toothing formations formed thereon. Radially outwardly, the turbine shell 38 is coupled, for example, by welding, to the input region 102 of the radially outwardly located first torsional vibration damper region 98. Radially inwardly, a central disk element providing the output region 112 of the second torsional vibration damper region 98 is axially supported with respect to the gearbox-side housing shell 16 by the axial bearing 116, while a driven element 96 provided as a separate structural component part is connected to the output region 112, for example, by riveting, and extends with one axial end region 130 into the pump hub 22. The axial bearing support at the other side can be carried out by a bearing, not shown in FIG. 2, which can be positioned between the dividing element 76 and the driven element 96.

The annular flow space 92 through which the fluid to be removed from the first space region 70 can flow is now formed between the end region 130 of the driven element 96 and the pump hub 22, which end region 130 extends axially into the pump hub 22. One or more openings 132 are formed in the pump hub 22; the fluid exiting the first space region 70 arrives via the opening(s) 132 in an intermediate space 134 which is defined between the outer side of the pump hub 22 and a gearbox housing 136 through a seal formation 138 at one axial side and a sealing/bearing formation 140 at the other axial side. A channel-like opening 142 formed at the gearbox housing 136 above the height level of the driven shaft 80 leads from this intermediate space region 134 to the inner area of the gearbox housing, where the fluid sump or oil sump is also formed.

As a result of providing this flow path for the fluid exiting the first space region 70, particularly when the flow path leading through the central opening 86 is terminated by a valve arrangement, the interior space 18 can only empty until the height level of the channel-like opening 142 even after an extended period of disuse.

The supply of fluid to the interior space 18 can take place via the central opening 86 of the driven shaft 18, the third space region 82 and the second aperture arrangement 90 to the second space region 72 and from the latter to the first space region 70. Alternatively or in addition, a channel 144 bridging the toothed engagement area and driven element 80 can be formed by an insert part in the driven shaft 80, which channel 144 leads out of an annular flow space 146 formed between the driven shaft 80 and the driven element 96 radially outward into the area of the first space region 70 formed between the driven element 96 and the dividing element 76. In this case, the second aperture arrangement 90 could be omitted and the clutch arrangement 10 could be built according to the three-line principle in which the supplying and discharging of fluid required for fluid circulation can be carried out entirely independent from the fluid supply to the third space region 82 that is required for actuating the clutch piston 54. In order to also prevent an emptying of the interior space 18 below the level of the channel-like opening 42 in this case, it must be ensured, for example, by a valve arrangement, that fluid cannot flow out via the annular flow space 146 back in the direction of a fluid pump. In this case, a fluid pump of this kind can itself possibly prevent the backflow. Further, a non-return valve could be arranged in this flow space.

Figure 3:
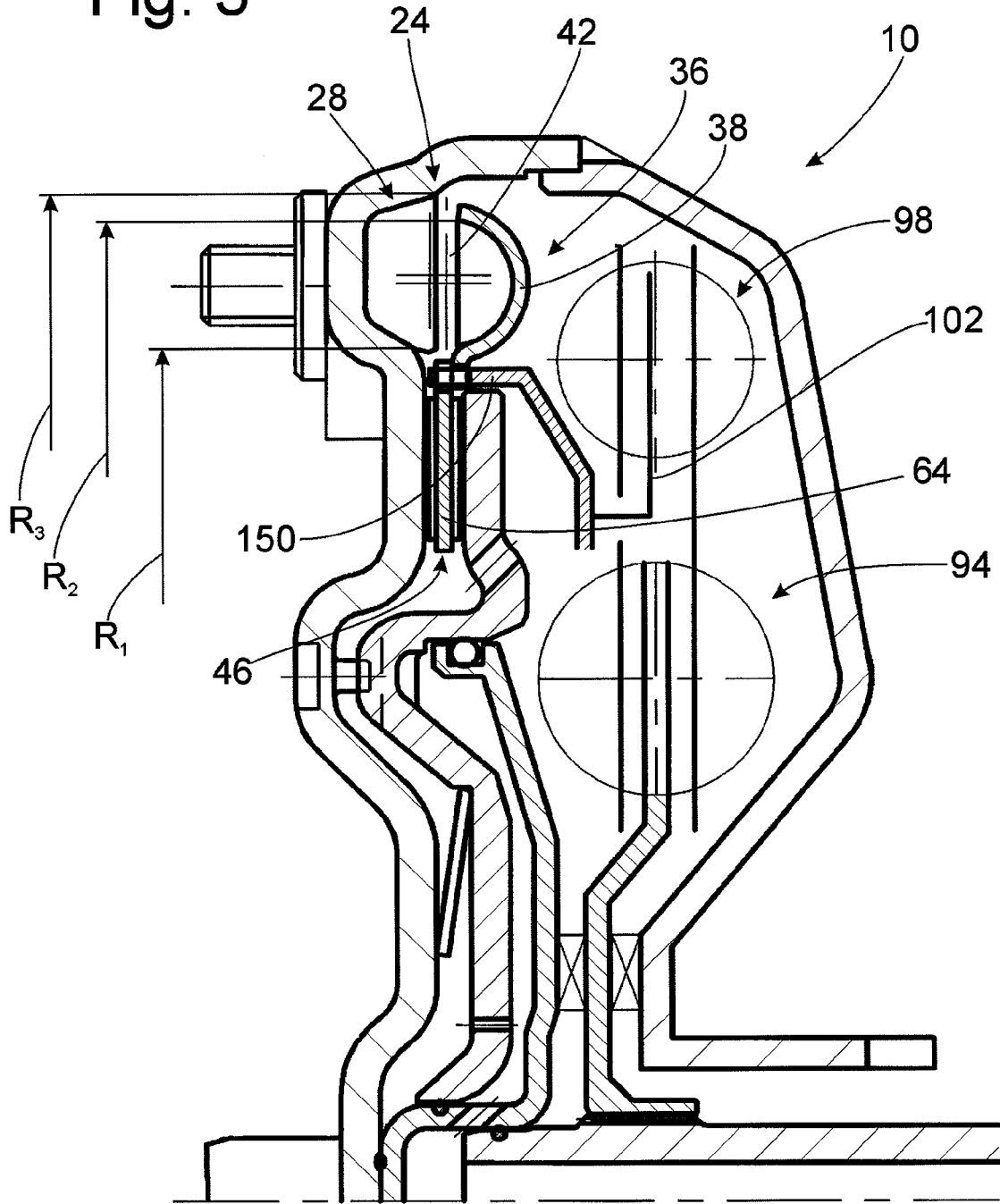
FIG. 3 is an alternative embodiment form in a view corresponding to FIG. 1.

Another alternative variant of the clutch arrangement 10 is shown in FIG. 3. This clutch arrangement 10 corresponds in many ways to the construction shown in FIG. 1, but diverges in the area of the fluid coupling region 24. It will be seen again that the toroidal fluid circulation space 42 is defined radially inwardly by the impeller 28 and the turbine 36 on approximately the same radial level $R_1$. Radially outwardly, the turbine 36 defines the toroidal fluid circulation space 42 farther radially inwardly than the impeller 28. Further, the cross-sectional geometries selected for the impeller 28 and the turbine 36 diverge from one another so that the part of the toroidal fluid circulation space defined by the turbine 36 has an approximately circular cross-sectional geometry, while a polygonal geometry is chosen for the portion of the toroidal fluid circulation space 42 defined by the impeller 28. It will further be seen that the impeller 36 and the second friction surface formation 46 or a friction lining carrier 64 thereof are formed in this case as separate structural component parts. The coupling to the input region 102 of the first torsional vibration damper region 98 is carried out by a structural component part 150 provided with an axial toothed plug-in formation and which engages axially in the turbine shell 38 and friction lining carrier 64 which have corresponding toothed formations and contact one another in this area of the positive engagement so as to adjoin one another axially.

In this embodiment form as in the embodiment forms described above, both the turbine 36 and the second friction surface formation 46 are also coupled to the input region 102 of the radially outer first torsional vibration damper region 98 of the torsional vibration damper arrangement 94 and are accordingly associated with respect to mass with a drive-side mass.

Figure 4:
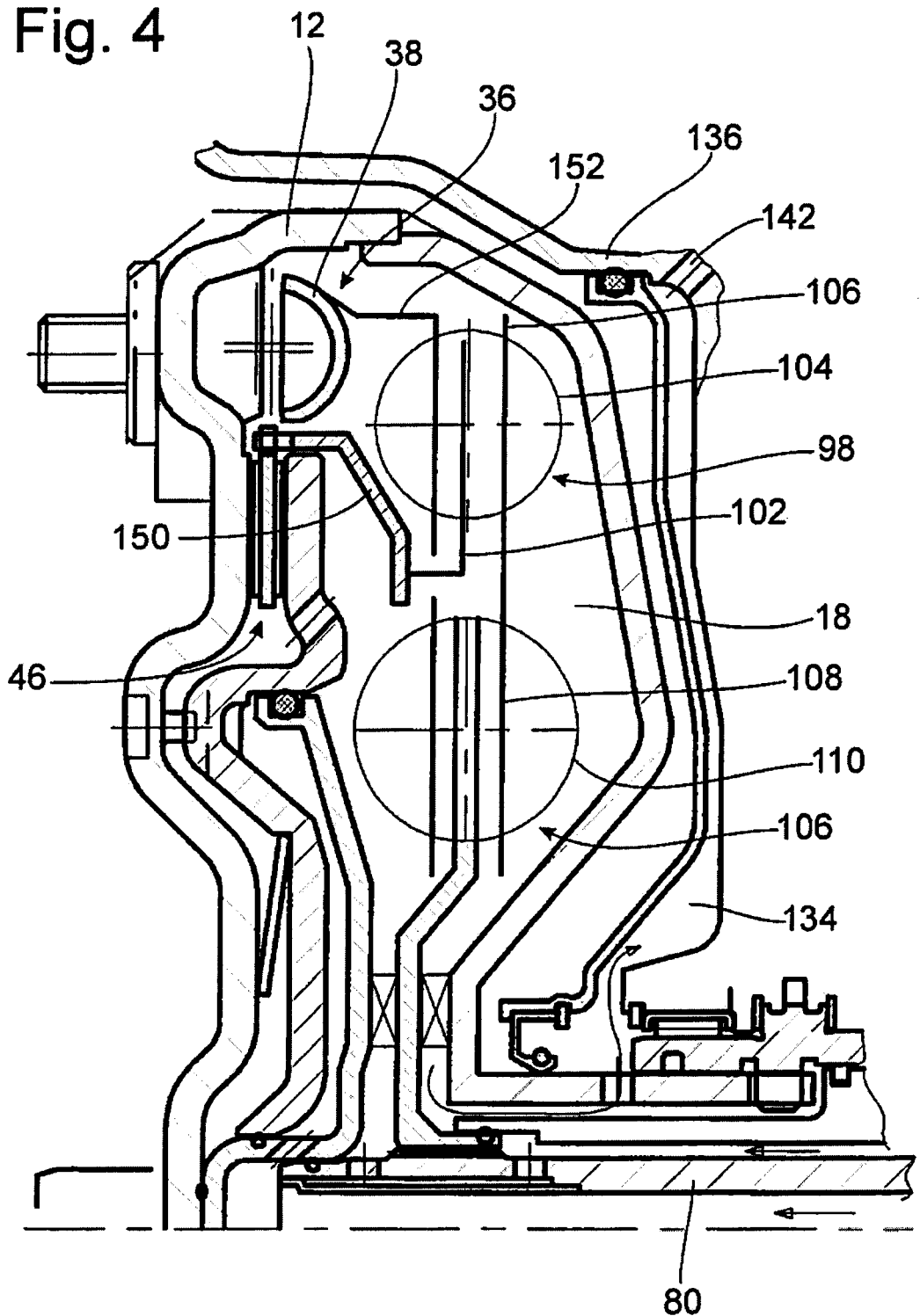
FIG. 4 is an alternative embodiment form in a view corresponding to FIG. 1.

An arrangement diverging therefrom is shown in FIG. 4. While, in this case, the second friction surface formation 46 is again connected to the structural component part 150 and, therefore, to the input region 100 of the first torsional vibration damper region 98 as was shown above referring to FIG. 9, the turbine 36 or the turbine shell 38 thereof is coupled to the output region 106 of the first torsional vibration damper region 98 and, therefore, to the input region 108 of the second torsional vibration damper region 100. This can take place, for example, by corresponding construction of one of the cover disk elements of the input region 106 or by providing a connecting structural component part 152 producing the connection.

Accordingly, in this constructional variant the turbine 36 is associated with respect to mass to an intermediate region which lies between the two damper spring arrangements 104, 110 so that the operating principle of a three-mass damper can be used to an increased extent in this instance.

Another discernable difference in FIG. 4 consists in that the intermediate space region 134 formed for receiving the outflowing fluid passes appreciably farther radially outward. The channel-like opening 142 which lies above the height level of the driven shaft 82 and which leads into the interior of the gearbox housing 136 lies in this case at a height level which approximately corresponds to the radially outer region of the housing arrangement 12 positioned above in vertical direction. This means that even after an extended period of disuse an emptying of the interior space 18 of the housing arrangement 12 cannot occur in practice because fluid remains in the interior space 18 at least up to the height level of the channel-like opening 142.

Figure 5:
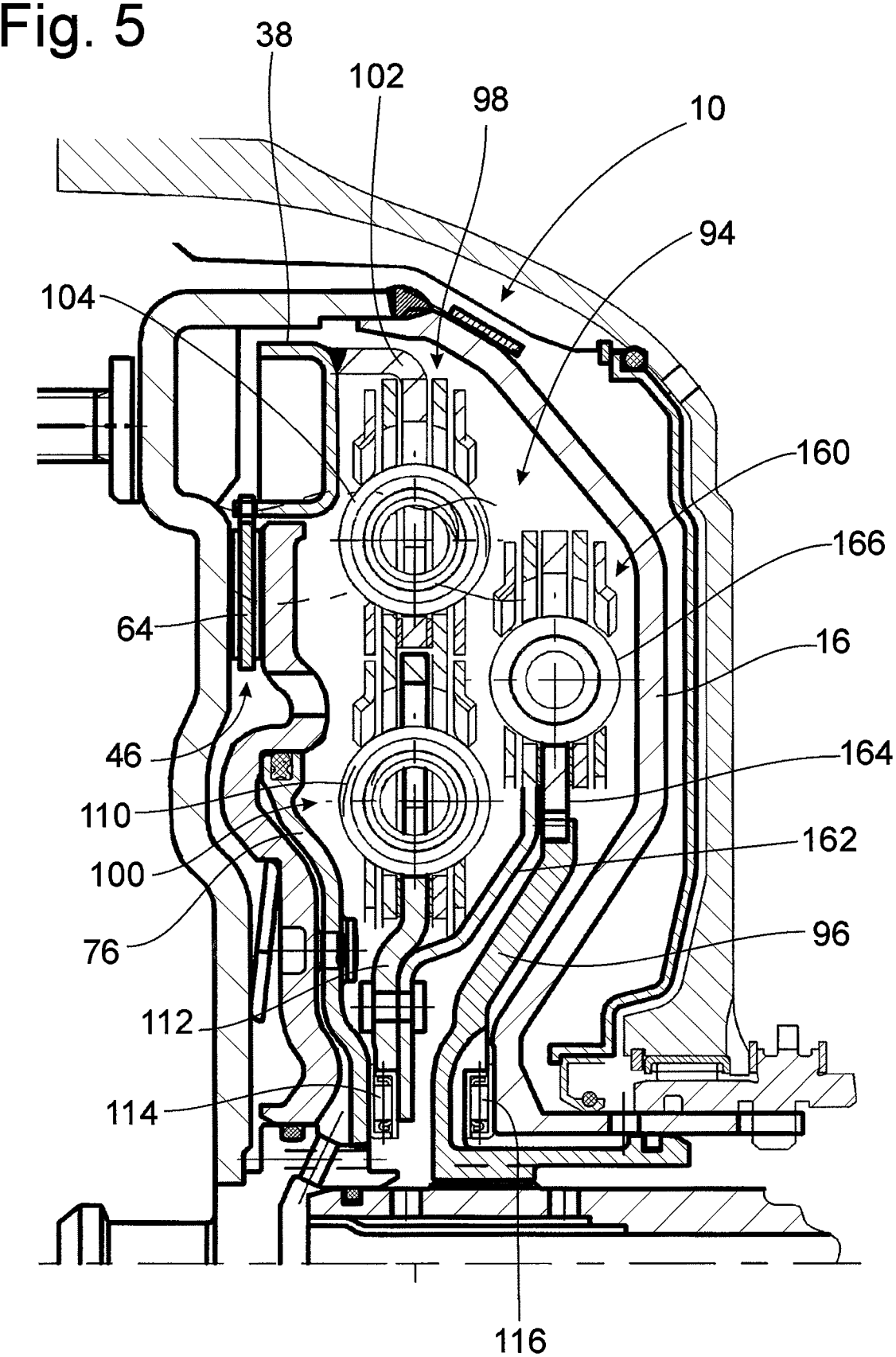
FIG. 5 is an alternative embodiment form in a view corresponding to FIG. 1.

FIG. 5 shows an embodiment form of a wet clutch arrangement in which various aspects described above are combined. Further, it can be seen from FIG. 5 that the torsional vibration damper arrangement 94 is constructed in this case with three torsional vibration damper regions 98, 100 and 160. The two torsional vibration damper regions 98, 100 which are arranged in series and also so as to be radially staggered are substantially constructed as shown, for example, in FIG. 2. The input region 102 of the radially outer first torsional vibration damper region 98 is connected, for example, by welding, to the turbine shell 38 which is coupled to the friction lining carrier 64 of the second friction surface formation 46 by a toothed positive engagement. The output region 112 of the radially inner second torsional vibration damper region, which output region 112 is constructed, for example, as a central disk element, is connected, for example, by riveting, to an input region 162 of the third torsional vibration damper region 160. This input region 162 can comprise two cover disk elements, one of which is lengthened radially inwardly and can accordingly be connected to the output region 112 of the second torsional vibration damper region 100. In the area of this connection, the torsional vibration damper arrangement 94 is axially supported at the dividing element 76 by the bearing 114. The axial support is carried out by the radially inwardly extending input region 162 of the third torsional vibration damper region 160, while the radial bearing support is carried out by the radially inner end area of the output region 112 of the second torsional vibration damper region 100.

An output region 164 of the third torsional vibration damper region 160 which is provided, for example, by a central disk element located between the cover disk elements of the input region 162 and coupled to the input region 162 by a damper spring arrangement 166 of the third torsional vibration damper region 160 for transmitting torque is coupled with the driven element 98 by positive engagement. The driven element 96 is supported by the axial bearing 116 axially with respect to the gearbox-side housing shell 16. In this case, another bearing could be provided axially between the two bearings 114, 116, i.e., between the driven element 96 and the radially inwardly extended area of the input region 162 of the third torsional vibration damper region 160, which additional bearing could axially support these two assemblies with respect to one another.

The third torsional vibration damper region 160 is arranged axially following the component group comprising the first torsional vibration damper region 98 and the second torsional vibration damper region 100 and is located approximately at the middle radial level so that the damper spring arrangement 166 of the third torsional vibration damper region 160 lies radially approximately between the damper spring arrangement 104 of the first torsional vibration damper region 98 and the damper spring arrangement 110 of the second torsional vibration damper region 100. Therefore, the torsional vibration damper arrangement 10 is an arrangement that is stepped in axial direction and conforms to the doubly curved contour of the gearbox-side housing shell 16.

In a wet clutch arrangement 10 and different variants thereof which were described above with reference to FIGS. 1 to 5, the transmission of torque is carried out through the fluid coupling region 24 and the friction coupling region 26; in addition, by the fluid coupling region 24, particularly the impeller 28 thereof, a fluid circulation which efficiently circulates around the two friction surface formations 44, 46 is generated in the interior space 18 of the housing arrangement 12. In the following, embodiment forms will be described in which the clutch arrangement comprises only a friction coupling region, but in which it is nevertheless ensured that an efficient circulating flow around the friction surface formations can be achieved.

Let it be noted that in important aspects such as, e.g., the construction of the torsional vibration damper arrangement, the control of the clutch piston and the supply and discharge of fluid to and from the housing arrangement, the construction is or can be as described above so that reference can be had to the preceding statements.

Figure 6:
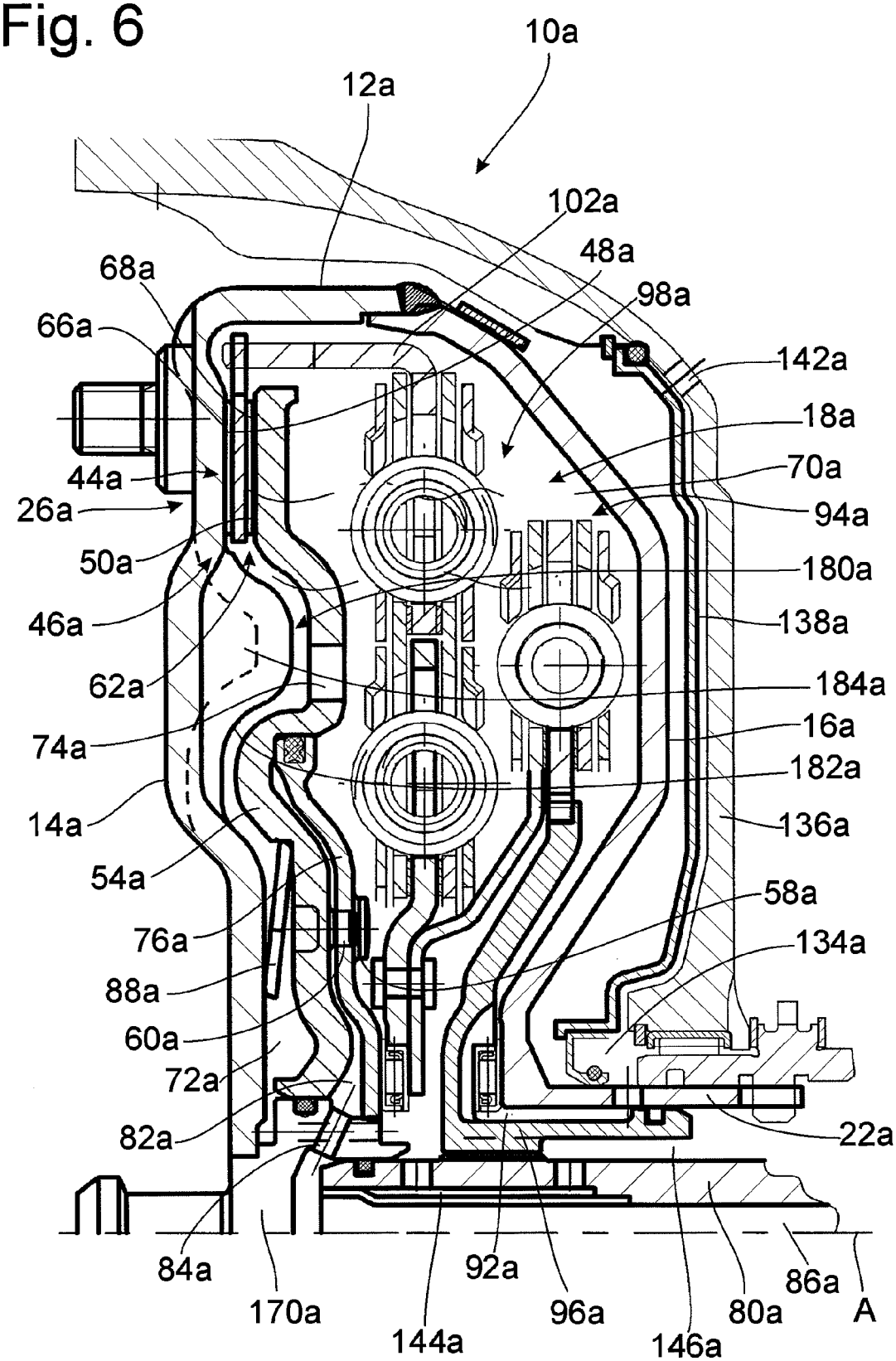
FIG. 6 is an alternative embodiment form in a view corresponding to FIG. 1.

It will be seen in FIG. 6 that the housing arrangement 12a comprises the engine-side housing shell 14a and the gearbox-side housing shell 16a. A housing hub 170a is provided at the radially inner region of the engine-side housing shell 14a; the clutch piston 54a is guided in its radially inner region on the housing hub 170a in a fluid-tight manner and so as to be axially movable; the dividing element 76a which is constructed as an annular disk in this case is connected to the housing hub 170a, for example, by welding. Openings 84a for supplying fluid in the third space region 82a are also provided in the housing hub 170a. This third space region 82a does not communicate with the second space region 72a so that only a displacement of the clutch piston 54a can be achieved by supplying to the third space region 82a. Fluid is supplied to the first space region 70a and second space region 72a via the annular flow space 146a and the channel 144a formed in the driven shaft 80a, while the removal of fluid is carried out between the driven element 96a and the gearbox-side housing shell 16a and via the intermediate space region 134a and the channel-like opening 142a located above in the vertical direction.

The friction coupling region 26a comprises the two friction surfaces 48a, 50a of the first friction surface formation 44a and the friction surfaces formed at the friction linings 66a, 68a of the friction element 62a of the second friction surface formation 46a. It will be seen that in this case the friction coupling region 26a is arranged in the radially outermost region of the housing arrangement 12a and the second friction surface formation 26a is coupled to the input region 102a of the first torsional vibration damper region 98a of the torsional vibration damper arrangement 94a constructed in three stages in this case. In this case also, the spatial distribution is basically so configured that the torsional vibration damper arrangement 94a is received substantially completely in the volume area of the interior space 18a enclosed by the gearbox-side housing shell 16a, while the components associated with the friction coupling region 26a, particularly also the dividing element 76a and the clutch piston 54a, are received in the volume area of the interior space 18a enclosed by the engine-side housing shell 14a.

The first aperture arrangement 74a again produces a fluid exchange connection between the first space region 70a and the second space region 72a radially inwardly of the friction surface formations 44a, 46a. A pump formation, designated generally by 180a, is provided so that the fluid circulation serving for circulating around the friction surface formations 44a, 46a is formed between the first space region 70a and the second space region 72a. In the illustrated example, this pump formation 180a comprises a plurality of shaped portions 182a of the engine-side housing shell 14a which are arranged successively in circumferential direction and directed into the interior space 18a; these shaped portions 182a provide pump delivery surfaces 184a which are oriented, respectively, in circumferential direction. It will be seen that these shaped portions 182a substantially correspond with respect to their shape to the selected shape of the pump piston 54a in this region. Let it be noted that the clutch piston 54a in this embodiment form is coupled to the dividing element 76a by axial shaped portions 60a formed at the clutch piston 54a, and shaped portions 58a which form corresponding openings are formed at the dividing element 76a so as to be associated with shaped portions 60a.

By the pump formation 180a, including its pump delivery surfaces 184a, which is formed radially inside the friction surface formations 44a, 46a substantially in the second space region 72a, the fluid present in the second space region 72a is set in rotation during rotational operation and, in so doing, is conveyed radially outwardly under the action of centrifugal force. In so doing, it flows around the friction surface formations 44a, 46a, possibly through channel-like flow channels provided at the latter, and then arrives in the radially outer region in the first space region 70a. Accordingly, an efficient circulation is generated around the friction surface formations 44a, 46a and cooling is ensured in this way.

Figure 7:
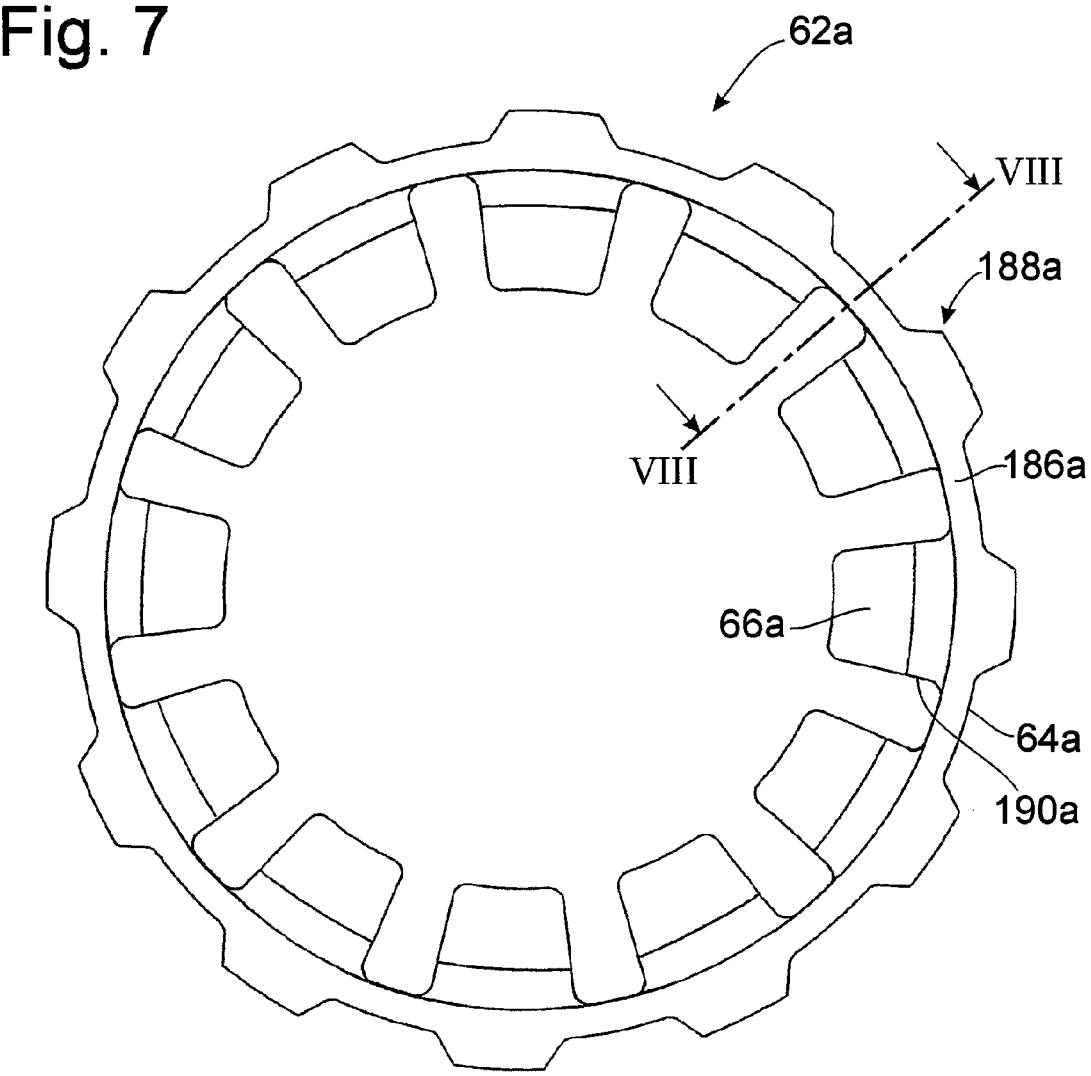
FIG. 7 is an axial view of a friction element used in the clutch arrangement of FIG. 6.
Figure 8:
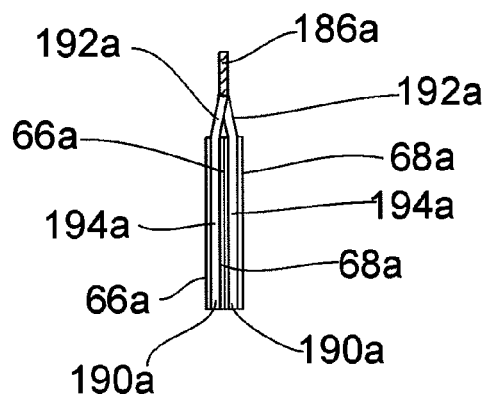
FIG. 8 is a sectional view of the friction element from FIG. 7 in section along a line VIII-VIII.

FIGS. 7 and 8 show the friction element 62a in an axial view and in longitudinal section. It will be seen that this friction element 62a has an annular body region 186a at which a toothing formation 188a is formed radially outwardly for coupling to the torsional vibration damper arrangement 94a. Lining carrier segments 190a of the friction lining carrier 64a extend radially inward from the annular body region 186a. These lining carrier segments 190a are axially bent in a bend region 192a which can be seen clearly in FIG. 8, this bend being provided in opposite axial direction, respectively, with lining carrier segments 190a arranged directly successively in circumferential direction. Lining carrier segments 194a carrying friction linings 66a, 68a on both axial sides are then located radially inside these bend regions 192a.

Since the friction lining carrier 64a is generally constructed as a shaped sheet metal part, particularly of sheet steel or spring steel sheet, a lining suspension is integrated in a friction element 62a of this kind by this alternating bending in different axial directions and ensures that a gradual increase in torque can be generated when engaging the friction coupling region 26a, during which the bend regions 192a gradually deflect due to the occurring axial load.

A friction element 62a constructed in this way can, of course, also be provided in the other illustrated embodiment forms, particularly also when the second friction surface formation has a plurality of friction elements 62a of this kind axially in succession. The first friction surface formation could also have one or more friction elements 62a of this kind in a different constructional embodiment.

Figure 9:
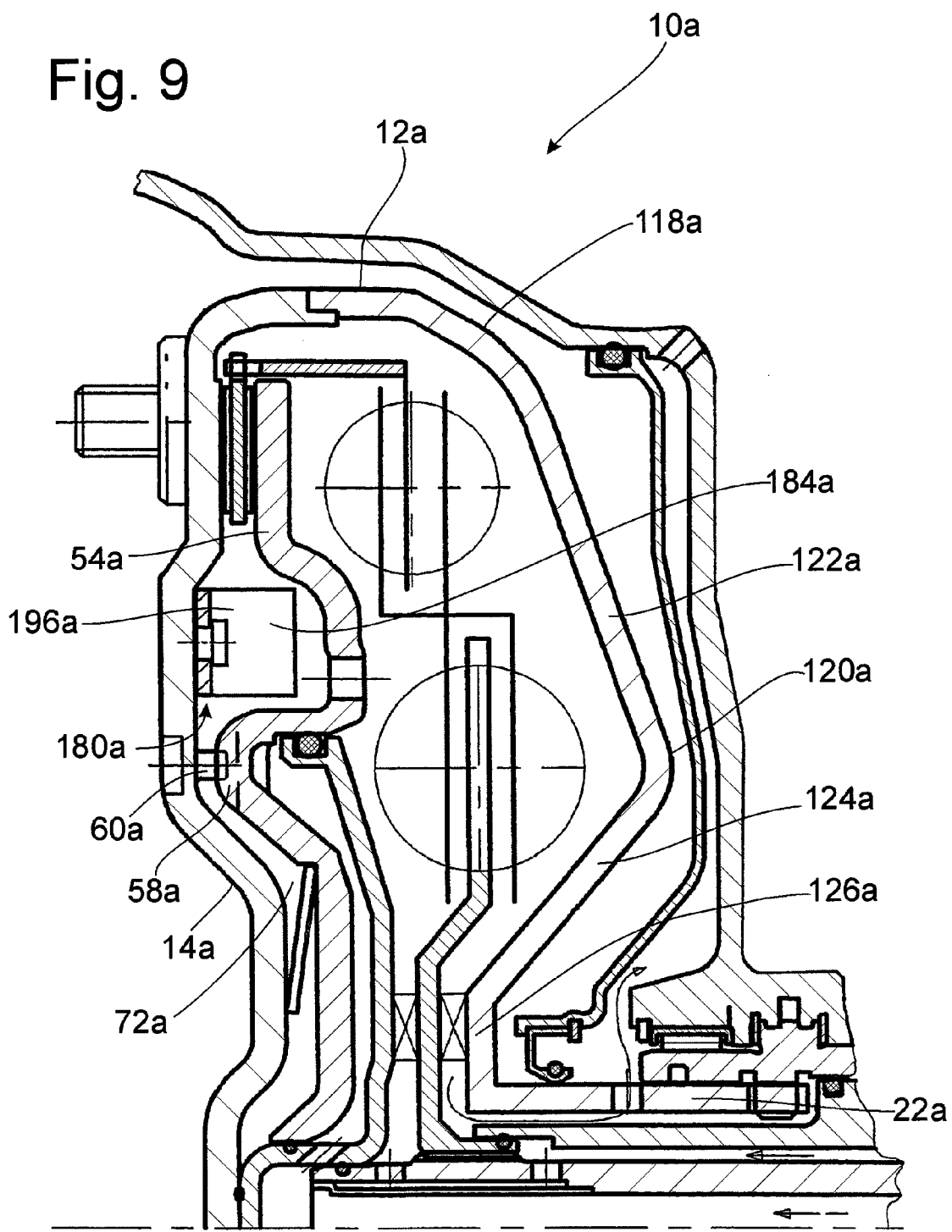
FIG. 9 is a view in partial longitudinal section through another alternative embodiment form of a wet clutch arrangement.

FIG. 9 shows a constructional variant in which the pump formation 180a is again provided at the engine-side housing shell 14a of the housing arrangement 12a. In this case, however, the pump formation 180a is formed not by shaped portions but by pump vane elements 196a which are fixed to the inner side of the engine-side housing shell 14a, for example, by riveting. In order to produce this riveting, rivet portions formed by corresponding pressed out portions can be provided at the engine-side housing shell 14a so that it is not necessary to produce openings in the engine-side housing shell 14a which could promote fluid leaks. The pump vane elements 196a provide the pump delivery surfaces 184a which are respectively oriented approximately in circumferential direction and which entrain the fluid contained in the second space region 72a in circumferential direction and are accordingly subject to centrifugal force.

Let it be noted that the pump formation 180a can also comprise an impeller which is annularly closed in circumferential direction and at which the pump vane elements 196a can be formed and which is to be fixed to the engine-side housing shell 14a as a structural component part.

Figure 10:
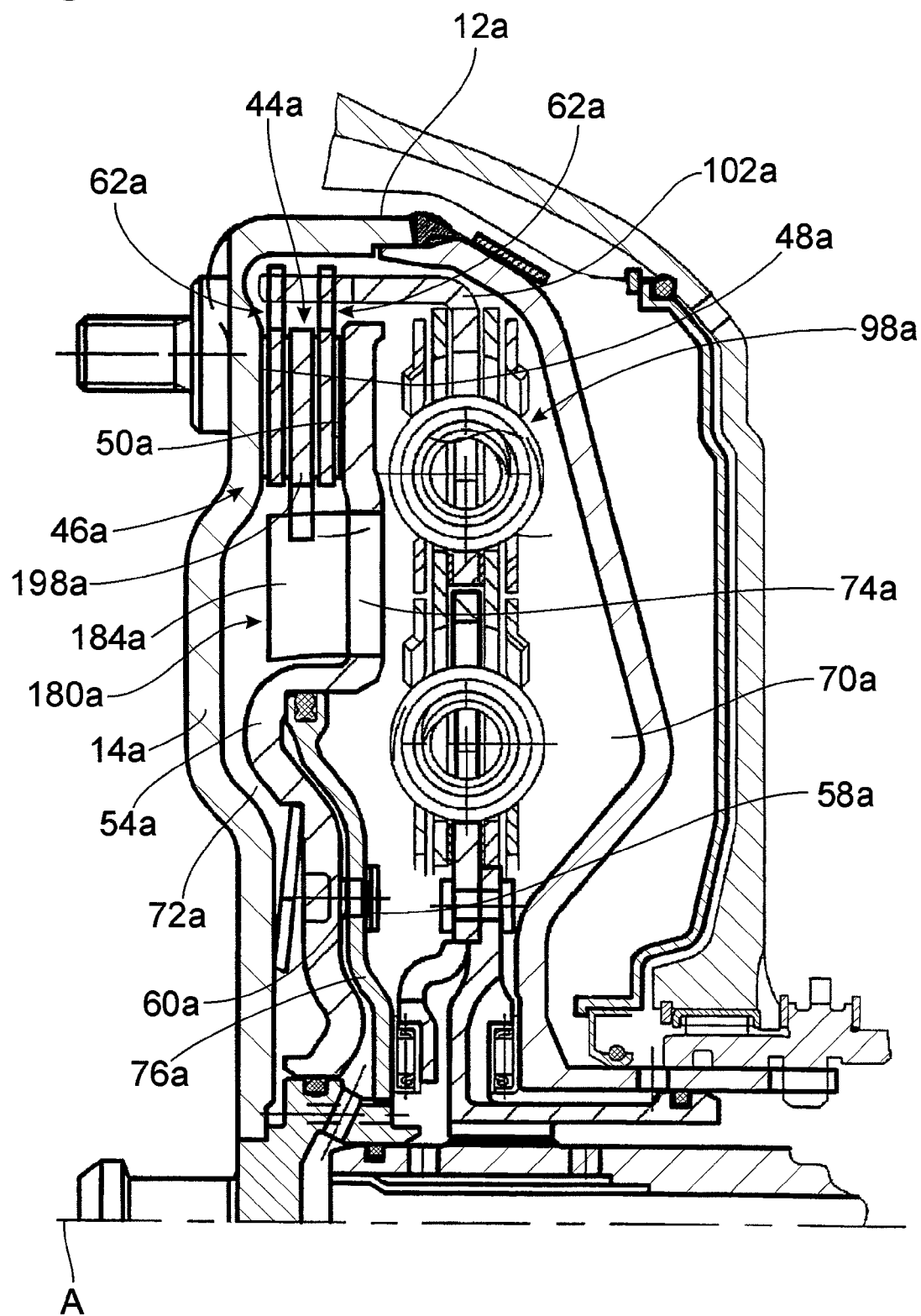
FIG. 10 is a view in partial longitudinal section through another alternative embodiment form of a wet clutch arrangement.

FIG. 10 shows a constructional variant in which, as will be seen, the second friction surface formation 46a comprises two friction elements 62a, for example, having the construction shown in FIGS. 7 and 8, which are arranged axially one after the other. These friction elements 62a are coupled radially outwardly by toothed positive engagement to the input region 102a of the first torsional vibration damper region 98a, for example, by an axially bent region of the central disk element which substantially provides this input region 102a. An annular disk-shaped friction element 198a of the first friction surface formation 44a lies between these two friction elements of the second friction surface formation 46a which each carries friction linings at both axial sides. This friction element 198a is formed without a friction lining, for example, when the two friction elements 62a are formed with friction linings, and is coupled to the clutch piston 54a radially inwardly by toothed positive engagement. This clutch piston 54a is again coupled via the dividing element 76a in a manner already described above to the housing arrangement 12a so as to be fixed with respect to rotation relative to it. Accordingly, the friction element 198a rotates around the axis of rotation A together with the structural component parts, i.e., the engine-side housing shell 14a and clutch piston 54a, providing the friction surfaces 48a, 50a.

A plurality of tab-like bent out portions providing the pump formation 180a and respective pump delivery surfaces 184a are distributed along the circumference of the clutch piston 54a. These bent out portions form the apertures of the first aperture arrangement 74a for producing a toroidal fluid circulation space between the first space region 70a and the second space region 72a directly radially inside the two friction surface formations 44a, 46a. These tab-like bent out portions 184a accordingly form not only the pump vanes which generate and support a fluid circulation but, at the same time, also elements which are formed integral with the pump piston 54a and to which the friction element 198a of the first friction surface formation 44a is connected so as to be substantially fixed with respect to rotation relative thereto but at the same time also so as to be axially movable.

Figure 11:
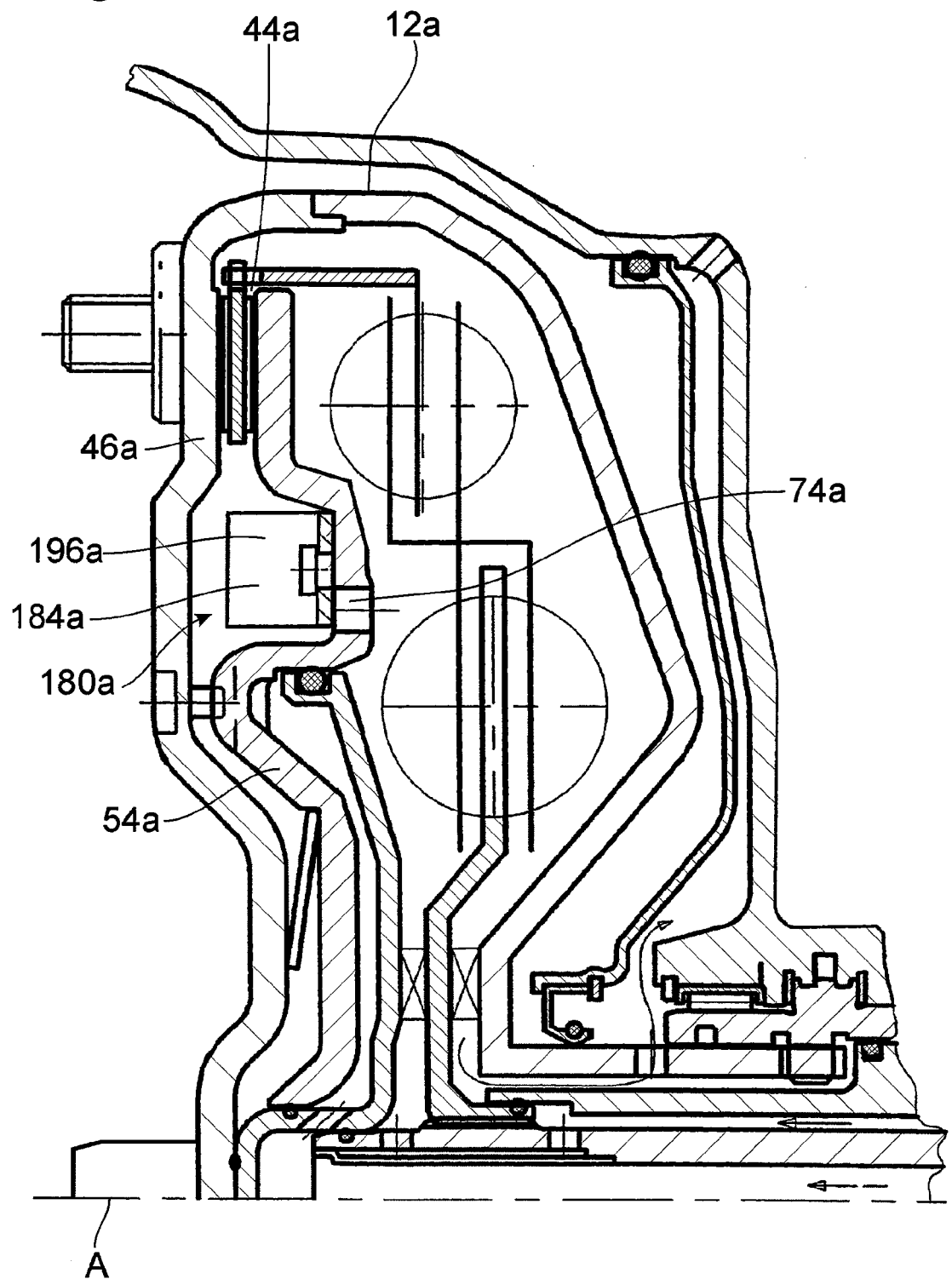
FIG. 11 is a view in partial longitudinal section through another alternative embodiment form of a wet clutch arrangement.

A modification of this embodiment type is shown in FIG. 11. In this case, too, the pump formation 180a is provided at the pump piston 54a which is coupled to the housing arrangement 12a for corotation around the axis of rotation A; however, in this case as well, for example, a plurality of pump vane elements 196a arranged successively in circumferential direction for providing the pump delivery surfaces 184a are arranged at the clutch piston 54a radially inside the two friction surface formations 44a, 46a. Rivet elements provided, for example, by integral shaped portions of the clutch piston 54a can be used for this purpose. The apertures of the first aperture arrangement 74a can lie radially inside or in circumferential direction between these pump vane elements 196a.

Of course, it is also possible in this case to fix an impeller to the clutch piston 54a, which impeller is provided as an annular assembly.

Figure 12:
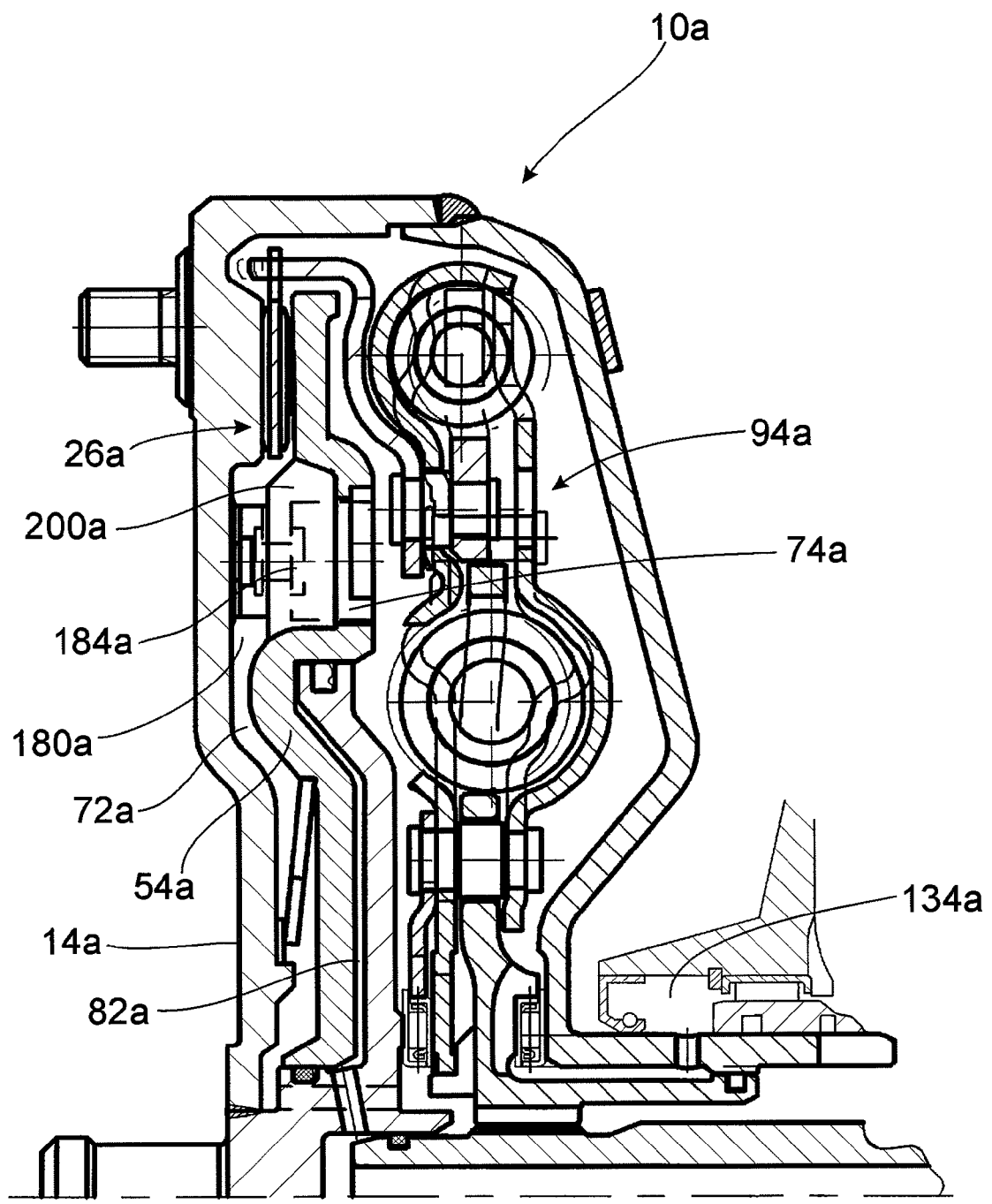
FIG. 12 is a view in partial longitudinal section through another alternative embodiment form of a wet clutch arrangement.

FIG. 12 shows a constructional variant in which the pump formation 180a is provided radially inside the friction coupling region 26a at the clutch piston 54a. In this case, the pump formation 180a can form an integral component part of the clutch piston 54a formed by deformation of a sheet metal blank used for producing the pump piston 54a, which component part comprises a plurality of shaped portions 200a which are formed in the radial region between the third space region 82a and the friction coupling region 26a. These shaped portions 200a which are arranged successively in circumferential direction form pump delivery surfaces 184a which are oriented approximately in circumferential direction and by which the fluid contained in the second space region 72a is entrained in circumferential direction and therefore subjected to loading by centrifugal force that conveys the fluid radially outwardly into the area of the friction coupling region.

It will further be seen from FIG. 12 that the rotational coupling of the clutch piston 54a to the engine-side housing shell 14a is carried out in the area of these shaped portions 200a. To this end, for example, a plurality of coupling elements which are oriented in circumferential direction, e.g., leaf spring elements, can be fixed, e.g., by riveting, to the engine-side housing shell 14a on one side and to the clutch piston 54a in the area of the shaped portions on the other side so that, in addition to the rotational coupling, an axial movability of the clutch piston 54a is ensured at the same time for engaging or disengaging the friction coupling region 26a.

It is ensured by the present invention that torque can be transmitted in a wet clutch arrangement, particularly when a fluid coupling region is provided in addition to the friction coupling region, even when the interior space of the housing arrangement is only partially filled with fluid. In addition, it is ensured that a reliable removal of heat from the area of the friction surface formations entering into frictional interaction with one another is guaranteed by providing an impeller and a pump formation.

It is noted that the different aspects which are described above and which are also defined in the claims can, of course, be combined with one another. For example, given a corresponding damping requirement, the torsional vibration damper arrangement can, of course, be constructed in three stages or, if sufficient, also in one stage in any of the constructional variants. Further, it goes without saying that the pump formation which is provided, for example, at the clutch piston or engine-side housing shell can also be provided when the clutch arrangement comprises the fluid coupling region with the impeller and the turbine for assisting the impeller. The impeller arranged radially outside the friction surface formations on one hand and the pump formation arranged radially inside the friction surface formations on the other hand can then generate and reinforce the fluid circulation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A wet clutch arrangement, comprising:
    a housing arrangement that is one of filled with a fluid and fillable with the fluid;
    a friction coupling region having:
        a first friction surface formation that rotates with the housing arrangement around an axis of rotation; and
        a second friction surface formation that rotates with a driven element around the axis of rotation and which can be brought into frictional engagement with the first friction surface formation;
    a pressing element by which the first friction surface formation and the second friction surface formation are brought into frictional engagement;
    an interior space of the housing arrangement that is divided by the pressing element into a first space region containing a turbine and a second space region located substantially radially inside the friction surface arrangements; and
    a dividing element that together with the pressing element defines a third space region that is separated from the first space region and second space region, wherein the fluid can be supplied to the third space region for actuating the pressing element,
    wherein the pressing element has a first aperture arrangement connecting the first space region to the second space region radially inside the friction surface formations.

2. The wet clutch arrangement according to claim 1, wherein the pressing element is connected to the housing arrangement for corotation therewith.

3. The wet clutch arrangement according to claim 1, wherein the third space region is located at an axial side of the pressing element facing the first space region.

4. The wet clutch arrangement according to claim 3, wherein, at an axial side of the pressing element remote of the third space region, a pre-loading arrangement loads the pressing element in opposition to a fluid pressure generated in the third space region.

5. The wet clutch arrangement according to claim 1, wherein the pressing element has a second aperture arrangement connecting the third space region to the second space region radially inside the first aperture arrangement.

6. The wet clutch arrangement according to claim 5, wherein a total cross-sectional flow area of the first aperture arrangement is larger than a total cross-sectional flow area of the second aperture arrangement.

7. The wet clutch arrangement according to claims 5, further comprising a pump formation provided at one of the housing arrangement and the pressing element for circumferentially entraining fluid contained in the first space region or in the second space region.

8. The wet clutch arrangement according to claim 7, wherein the pump formation has at least one pump delivery surface in the second space region arranged radially inside the friction surface formations.

9. The wet clutch arrangement according to claim 7, wherein the pump formation has at least one pump delivery surface in the first space region arranged radially outside the friction surface formations.

10. A wet clutch arrangement comprising:
    a housing arrangement that is one of filled with a fluid and fillable with the fluid;
    a friction coupling region having:
        a first friction surface formation that rotates with the housing arrangement around an axis of rotation; and
        a second friction surface formation that rotates with a driven element around the axis of rotation and which can be brought into frictional engagement with the first friction surface formation;
    a pressing element by which the first friction surface formation and the second friction surface formation are brought into frictional engagement;
    an interior space of the housing arrangement that is divided by the pressing element into a first space region containing a turbine and a second space region located substantially radially inside the friction surface arrangements; and
    a dividing element that together with the pressing element defines a third space region that is separated from the first space region and second space region,
    wherein the fluid can be supplied to the third space region for actuating the pressing element wherein the dividing element is formed in a disk-like manner and arranged axially opposite a housing shell of the housing arrangement,
    wherein the dividing element is connected in its radially inner area to the housing shell.

* * * * *